US006290396B1

United States Patent
Forbes-Robinson

(10) Patent No.: US 6,290,396 B1
(45) Date of Patent: Sep. 18, 2001

(54) STEERING ASSEMBLY HAVING A DEFORMABLE SLEEVE BEARING

(75) Inventor: Elliott Forbes-Robinson, Sherrills Ford, NC (US)

(73) Assignee: 600 Racing, Inc., Concord, NC (US)

( * ) Notice: Subject to any disclaimer, the term of this patent is extended or adjusted under 35 U.S.C. 154(b) by 693 days.

(21) Appl. No.: 08/592,025

(22) Filed: Jan. 26, 1996

(51) Int. Cl.$^7$ ........................................... F16C 17/24
(52) U.S. Cl. ............................................... 384/276
(58) Field of Search ................................ 384/129, 125, 384/215, 220, 222, 276, 296, 297, 299, 416, 428; 74/492, 493; 280/779, 780

(56) References Cited

U.S. PATENT DOCUMENTS

| 948,800 | 2/1910 | Symmonds, Jr. ........................ 74/492 |
| 1,555,214 | * 9/1925 | Johnson ........................... 280/780 X |
| 1,572,519 | * 2/1926 | Davis ...................................... 74/492 |
| 2,622,690 | 12/1952 | Barenyi ................................... 74/492 |
| 2,683,637 | * 7/1954 | Skillman, Jr. et al. ............. 384/299 |
| 3,521,501 | * 7/1970 | Kiekhaefer ....................... 74/493 X |
| 4,098,141 | 7/1978 | Yamaguchi ........................... 74/492 |
| 4,415,166 | 11/1983 | Beia ........................................ 277/51 |
| 4,517,854 | * 5/1985 | Kawabata et al. ............... 280/780 X |
| 4,726,695 | * 2/1988 | Showalter ......................... 384/125 X |
| 4,808,015 | * 2/1989 | Babcock ........................... 384/126 X |
| 5,192,137 | 3/1993 | Renard ................................. 384/375 |

FOREIGN PATENT DOCUMENTS

| 0719695 | 7/1957 | (EP) . |
| 1007998 | 11/1963 | (GB) . |

OTHER PUBLICATIONS

Deutschman, Aaron D., et al., Machine Design Theory and Practice, pp. 438–439, Dec. 1975.*

* cited by examiner

*Primary Examiner*—Thomas R. Hannon
(74) *Attorney, Agent, or Firm*—Fitzpatrick, Cella, Harper & Scinto

(57) ABSTRACT

A steering assembly including a steering shaft, a tubular housing, and at least one deformable sleeve bearing. The sleeve bearing is interposed between the tubular housing and the steering shaft wherein the shaft is rotatably supported. The sleeve bearing is formed of a polymeric material having a predetermined hardness which is less than the predetermined hardness of the steering shaft. Thus, if foreign matter such as dirt or debris enters the steering assembly, the sleeve bearing may be disfigured, thereby preventing the foreign matter from obstructing normal steering operations.

5 Claims, 1 Drawing Sheet

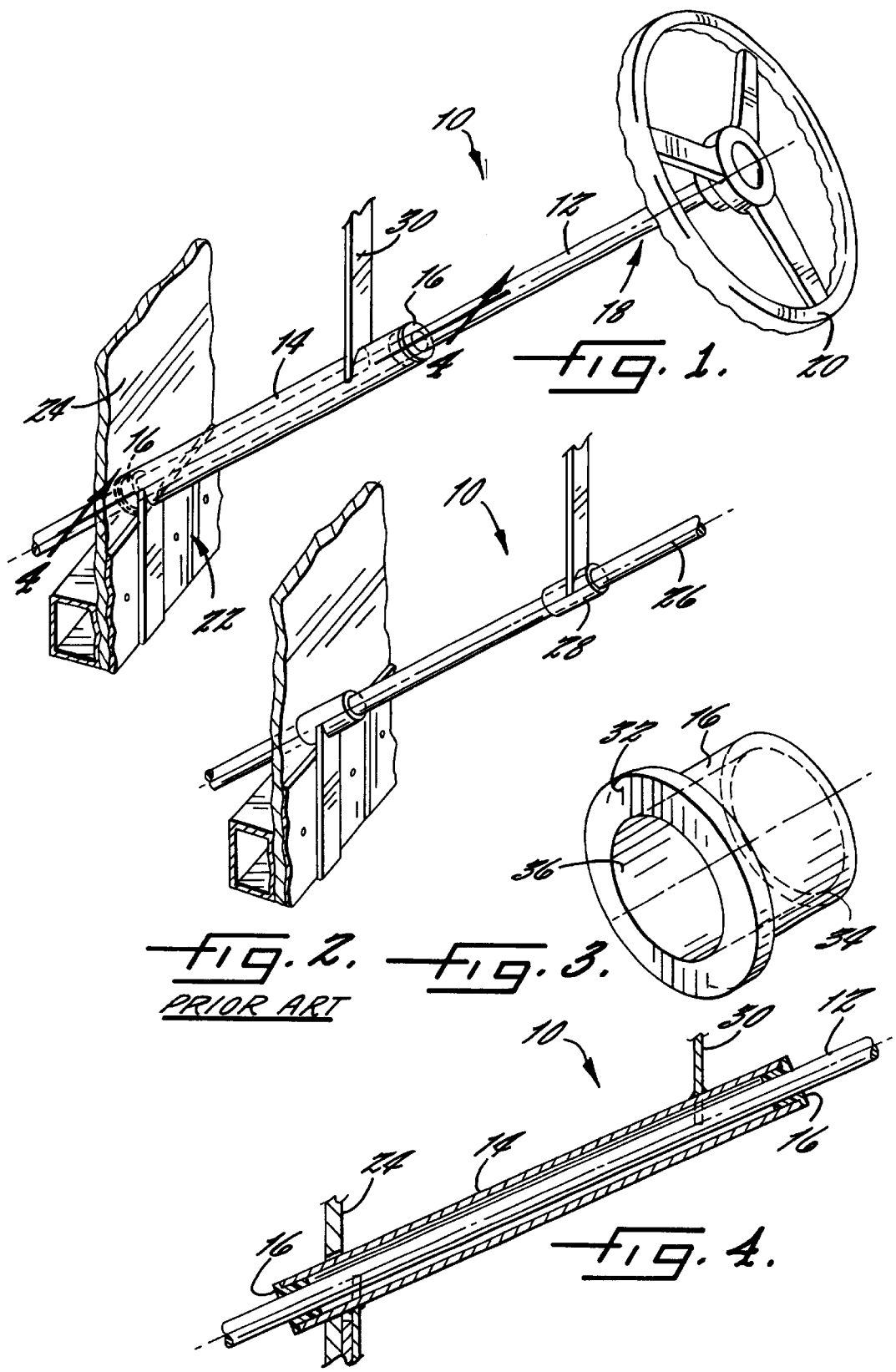

STEERING ASSEMBLY HAVING A DEFORMABLE SLEEVE BEARING

FIELD OF THE INVENTION

The present invention relates to a steering assembly for a vehicle and, more specifically, to a steering assembly having a deformable sleeve bearing for preventing foreign matter from affecting normal steering operations.

BACKGROUND OF THE INVENTION

Steering assemblies include, generally, a tubular housing configured to receive a correspondingly configured steering shaft arranged for rotatable movement within the tubular housing. Typically, the steering shaft is longer than its corresponding tubular housing wherein a portion of the steering shaft extends upward beyond the tubular housing's upper end for mounting a steering wheel. The other end of the steering shaft extends beyond the opposing or lower end of the tubular housing and extends, in a conventional vehicle, behind the dashboard or other wall defining the interior space of the vehicle body. The lower end of the steering shaft is then coupled to the steering mechanism associated with the vehicle wheels. Thus, rotational motion applied to the steering wheel may be transferred to the steering mechanism to steer the vehicle.

In most vehicles, such as domestic automobiles, the steering assembly is enclosed within the dashboard or other wall defining the interior space of the automobile. Thus, there is minimal or no threat that foreign matter such as debris may enter the steering assembly and affect its operability. Some vehicles, however, include an open body design such as racing cars. These vehicles generally do not include aesthetic features included in domestic vehicle designs such as walls defining the interior vehicle space for obscuring the mechanical components of the automobile from view. The aesthetic appearance of the car's interior is often not considered in racing car designs for several reasons including the unnecessary weight and costs involved.

Accordingly, foreign matter such as dirt and debris may contact the steering assembly in some vehicles, particularly racing cars. When the foreign matter enters the tubular housing, it may interfere with the normal operation of the steering assembly by preventing relative rotational movement between the steering shaft and the tubular housing. For instance, debris may become wedged between the steering shaft and the tubular housing thereby locking up the steering wheel and hence, the entire vehicle steering mechanism. The dangers and the need to avoid this occurrence are readily apparent.

The steering assemblies of prior art racing cars often include a pair of remotely spaced metal brackets for supporting the steering shaft. It may be the instance that the metal brackets are used in place of a tubular housing and therefore independently support the steering shaft. Thus, a metal-to-metal connection is defined by the metal steering shaft and the metal bracket. When foreign matter such as dirt or debris enters the vehicle compartment, it may become lodged within the steering assembly and interfere with the steering shaft's ability to rotate. If the foreign matter interferes with the rotational metal to metal connection of the steering shaft and bracket, the steering of the vehicle may be interrupted and even halted. Indeed, there is a need to prevent interruption of the steering mechanism by foreign matter contacting, as it will in racing cars, the steering assembly of the vehicle.

Prior art attempts have been made to provide improved mountings for the steering shafts within steering assemblies. These attempts do not, however, provide preventative measures for the aforementioned problems experienced particularly in vehicles such as racing cars. For example, U.S. Pat. No. 4,098,141 to Yamaguchi is directed to an energy absorbing steering assembly whereby the steering shaft is telescopically arranged within the steering column so that the steering assembly is collapsible upon impact. A collision at the front of the vehicle would cause relative movement in the axial direction between the steering shaft and the steering column. This relative movement is restricted during normal operation by a bearing supporting the upper end of the shaft. Impact against the steering wheel by the operator of the vehicle causes the steering shaft and column to move downwardly. The downward movement is prevented during normal operation by shear pins which are sheared upon impact, thereby permitting the steering assembly to collapse.

A prior art bearing for supporting the steering shaft is described in U.S. Pat. No. 2,622,690 to Barenyi. According to that patent, a bearing or sleeve is provided at the upper end of the steering shaft for supporting the shaft within the steering column. This arrangement is positioned within a housing. The Barenyi patent is directed to a steering assembly for use in a domestic automobile wherein the steering shaft is mounted, at its lower end, behind a wall defining the interior of the vehicle body. Although an upper bearing is provided, it merely supports the upper end of the shaft within the steering column and is itself protected from contact with foreign matter by the additional housing.

These and other prior art steering assemblies have many shortcomings and limitations which significantly restrict their usefulness in open vehicle body designs, such as racing cars, for preventing dirt or debris from interfering with the vehicles normal steering functions.

SUMMARY OF THE INVENTION

The present invention overcomes the shortcomings of the prior art and provides an apparatus and a steering assembly which is well suited to effectively prevent interference of the vehicle's normal steering operation by foreign matter such as dirt or debris.

More particularly, according to one embodiment of the invention, the apparatus includes an elongate metal steering shaft, a tubular housing, and a sleeve bearing. The tubular housing encloses a portion of the length of the steering shaft and is adapted to be fixed to the frame of a motor vehicle. At least one sleeve bearing is interposed between the steering shaft and the tubular housing for rotatably supporting the steering shaft. The sleeve bearing is formed of a polymeric material having a predetermined hardness which is substantially less than the hardness of the steering shaft. Therefore, in the event abrasive foreign matter enters between the steering shaft and the sleeve bearing, the sleeve bearing will be deformed or destroyed and binding between the steering shaft and the bearing is thereby precluded.

In another embodiment of the present invention, the steering assembly includes a steering shaft, a tubular housing and two sleeve bearings. The sleeve bearings are interposed between the steering shaft and the tubular housing adjacent each of the ends of the tubular housing for rotatably supporting the steering shaft. In this embodiment also, each of the sleeve bearings are formed of a polymeric material having a predetermined hardness which is substantially less than the hardness of said steering shaft.

BRIEF DESCRIPTION OF THE DRAWINGS

The foregoing and other features and advantages of the present invention will be made apparent from the following detailed description of the preferred embodiment of the invention and from the drawings, in which:

FIG. 1 is a perspective view of the steering assembly according to the present invention;

FIG. 2 is a prior art steering assembly;

FIG. 3 is a perspective view of the sleeve bearing according to the present invention; and FIG. 4 is a cross-sectional view taken along line 4—4 of FIG. 1.

DETAILED DESCRIPTION OF THE DRAWINGS

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art.

The motor vehicle steering assembly, generally indicated at 10, according to the present invention is shown in FIG. 1. The steering assembly 10 includes an elongate steering shaft 12, a tubular housing 14, and a sleeve bearing 16.

The steering shaft 12, in a preferred embodiment, is metal and supports at its upper end 18 a conventional steering wheel 20. At least a portion of the length of the steering shaft 12 extends within the tubular housing 14 and a lower end 22 of the steering shaft 12 extends beyond the lower end of the tubular housing 14. As shown in FIG. 1, the lower end 22 of the steering shaft 12 and a portion of the tubular housing 14 extend behind a wall 24 defining the vehicle compartment of the motor vehicle. The lower end 22 of the steering shaft 12 is connected to the steering mechanism (not shown) of the motor vehicle wherein the driver maneuvers the steering wheel 20. This thereby rotates the steering shaft 12 within the tubular housing 14 to operate the steering mechanism connected to the lower end 22 of the steering shaft 12.

The tubular housing 14 is configured to enclose a portion of the length of the steering shaft 12 and is also configured, at its ends, to receive a portion of the sleeve bearing 16. The tubular housing 14 is adapted to be fixed to the frame 30 of a motor vehicle. In the embodiment shown, the tubular housing 14 is annular, but any configuration enabling receipt of the steering shaft 12 and sleeve bearing 16 is acceptable.

Also in the embodiment shown, the tubular housing 14 is a unitary structure extending a significant length to enclose a substantial portion of the length of the steering shaft 12. In an alternative embodiment, however, the tubular housing 14 may not be a unitary structure but, rather, may comprise a set of displaced supports.

FIG. 2 illustrates a prior art steering assembly comprising an elongate metal steering shaft 26 which is supported by two tubular brackets 28 formed of metal. The metal elongate steering shaft 26 is rotatably mounted within the metal brackets 28 wherein each of the contacting surfaces associated with the rotational movement is metal. When foreign matter such as dirt or debris enters the steering assembly 10 it may become wedged between the metal steering shaft 26 and the metal bracket 28. In the event the debris is of sufficient size or if there is sufficient accumulation of debris, the rotational movement of the metal steering shaft 26 within the metal bracket 28 may be impeded and even halted as the steering assembly becomes jammed by the presence of the debris. Each of the members 26 and 28 are formed of metal, and each therefore has a substantial degree of hardness wherein neither member 26 or 28 will flex to accommodate the debris. This thereby locks the steering assembly wherein the driver will be unable to maneuver the steering wheel and, hence, control the motor vehicle.

The drawbacks and shortcomings of the prior art are obviated by the steering assembly according to the present invention including the deformable sleeve bearing 16 shown in detail in FIG. 3. The sleeve bearing 16 is positioned between the steering shaft 12 and the tubular housing 14 as illustrated in FIGS. 1–4. The bearing 16 supports the steering shaft 12 within the housing 14 and permits relative rotational movement therebetween. The sleeve bearing 16 is retained upon an associated end of the tubular housing by an external flange 32 formed at one of its ends. The sleeve bearing 16 also comprises a tubular sleeve 34 formed integrally with the flange 32 for receiving the steering shaft 12.

FIG. 4 is a cross-sectional view taken at line 4—4 of FIG. 1 illustrating, particularly, the elongated metal steering shaft 12, the tubular housing 14, and the sleeve bearing 16. The cylindrical housing 14 coaxially surrounds the steering shaft 12 in a spaced apart arrangement along the entire length of the tubular housing 14. The sleeve bearing 16 is interposed between the steering shaft 12 and tubular housing 14 adjacent each of the ends of the tubular housing 14. This arrangement permits relative rotational movement between the steering shaft 12 and the sleeve bearing 16 and hence the tubular housing 14.

The operation of the steering assembly 10 for motor vehicles will now be described in detail. In the event abrasive foreign matter enters between the steering shaft 12 and the sleeve bearing 16, the sleeve bearing 16 will become deformed or even destroyed thereby preventing any binding between the steering shaft 12 and the bearing 16. This result is achieved due to the different materials forming each of the steering shaft 12 and the sleeve bearing 16. The sleeve bearing 16 is formed of a polymeric material having a predetermined hardness which is substantially less than the hardness of the steering shaft 12. Thus, the entry of abrasive foreign matter will disfigure the internal surface 36 of the sleeve bearing 16. An article of debris may penetrate the surface 36 of the sleeve bearing 16 as opposed to blocking the radial space between the various members of the steering assembly 10; which space facilitates the rotational movement. This thereby does not prohibit the proper operation of the steering assembly 10 and permits the driver to manipulate the steering wheel 20. In extreme cases, when the sleeve bearing 16 has experienced significant damage, the bearing 16 may be inexpensively and easily replaced thereby saving substantial repair and replacement costs.

Although numerous materials may be selected for each the steering shaft 12 and the sleeve bearing 16, in the preferred embodiment, the steering shaft 12 is formed of metal and the sleeve bearing 16 is formed of nylon having a Brinell hardness not greater than about 90. In the preferred embodiment a sleeve bearing formed of Nylon MDS (molibdinium di-sulfide) manufactured by Solidur Pacific Corporation is used. This preferred material has a hardness of 89 Rockwell A. Other materials too, may be selected, the requirement being that the sleeve bearing 16 is formed of material having a predetermined hardness less than the hardness of the steering shaft 12. The sleeve bearing 16 may even be made of an alloy which has a hardness which is less than the steering shafts hardness.

The present invention has been described for use in open design cars such as racing cars. This disclosure is not however, thereto limited as it may be used in any vehicle, land, air, or aquatic, of any design, including conventional, domestic automobiles.

While particular embodiments of the invention have been described, it will be understood, of course, the invention is not limited thereto since modifications may be made to those skilled in the art particularly in light of the foregoing teachings. It is, therefore, contemplated by the appended claims to cover any such modifications that incorporate those features of these improvements in the true spirit and scope of the invention.

That which is claimed is:

1. A motor vehicle steering assembly comprising:

an elongate metal steering shaft having a predetermined hardness;

a tubular housing enclosing a portion of the length of said steering shaft and defining a radial gap between said steering shaft and said tubular housing, said tubular housing being adapted to be fixed to the frame of a motor vehicle; and at least one sleeve bearing interposed between said steering shaft and said tubular housing for rotatably supporting the steering shaft, said bearing comprising a tubular sleeve and an integral external flange formed at one end thereof wherein said sleeve bearing is positioned so that the flange engages an associated end of the tubular housing and the tubular sleeve substantially closes said radial gap at least along a portion of said steering shaft, said at least one sleeve bearing being formed of a polymeric material having a predetermined hardness which is substantially less than the predetermined hardness of said steering shaft wherein in the event abrasive foreign matter enters between the steering shaft and the sleeve bearing, the sleeve bearing will be deformed and binding between the steering shaft and the bearing is thereby precluded.

2. A motor vehicle steering assembly according to claim 1 wherein said sleeve bearing is composed of nylon having a Brinell hardness not greater than about 90.

3. A motor vehicle steering assembly comprising:

an elongate metal steering shaft having a predetermined hardness;

a tubular housing enclosing a substantial portion of the length of said steering shaft and defining a radial gap between said steering shaft and said tubular housing, said tubular housing being adapted to be fixed to the frame of a motor vehicle; and a pair of sleeve bearings, each interposed between said steering shaft and said tubular housing adjacent each end of the tubular housing for rotatably supporting the steering shaft, each of said bearings comprising a tubular sleeve and an integral external flange formed at one end thereof wherein each of said sleeve bearings is positioned so that the flange engages an associated end of the tubular housing and each of said tubular sleeves substantially closes said radial gap at least along a portion of said steering shaft, said pair of sleeve bearings each being formed of a polymeric material having a predetermined hardness which is substantially less than the predetermined hardness of said steering shaft, wherein in the event abrasive foreign matter enters between the steering shaft and a sleeve bearing, the sleeve bearing will be deformed or destroyed and binding between the steering shaft and the bearing is thereby precluded.

4. A motor vehicle steering assembly according to claim 3 wherein said tubular housing comprises a cylindrical tube which coaxially surrounds said steering shaft in a spaced apart arrangement along the entire length of said tubular housing.

5. A motor vehicle steering assembly according to claim 3 wherein each of said sleeve bearings is composed of nylon having a Brinell hardness not greater than about 90.

* * * * *